US007149408B2

(12) United States Patent
Kobayashi

(10) Patent No.: US 7,149,408 B2
(45) Date of Patent: Dec. 12, 2006

(54) METHOD AND APPARATUS FOR EDITING VIDEO DATA

(75) Inventor: Makoto Kobayashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1118 days.

(21) Appl. No.: 10/180,138

(22) Filed: Jun. 27, 2002

(65) Prior Publication Data
US 2003/0002852 A1 Jan. 2, 2003

(30) Foreign Application Priority Data
Jun. 27, 2001 (JP) ............................. 2001-195037

(51) Int. Cl.
H04N 5/91 (2006.01)
(52) U.S. Cl. .......................................... 386/46; 386/52
(58) Field of Classification Search .................. 386/46, 386/52, 109, 121; 348/393–398, 563–568, 348/584, 588
See application file for complete search history.

(56) References Cited
U.S. PATENT DOCUMENTS
5,930,446 A    7/1999  Kanda 5,990,976 A *  11/1999  Higashida ................... 348/588
6,154,601 A    11/2000  Yaegashi et al.
6,445,928 B1 *  9/2002  Ruutu et al. ................. 455/502

FOREIGN PATENT DOCUMENTS
| JP | 7-203373 | 8/1995 |
| JP | 8-23520 | 1/1996 |
| JP | 9-247614 | 9/1997 |
| JP | 10-285532 | 10/1998 |
| JP | 2000-59720 | 2/2000 |

* cited by examiner

Primary Examiner—Thai Q. Tran
Assistant Examiner—Mishawn Dunn
(74) Attorney, Agent, or Firm—Finnegan, Henderson, Farabow, Garrett & Dunner, L.L.P.

(57) ABSTRACT

Disclosed herein is a moving-picture editing apparatus that comprises a display device and a controller. The display device has a display screen and can display the frames forming a moving picture, on the display screen in the form of a frame matrix based on the frame rate and display unit time. The controller determines a number of rows and a number of columns in which to display the frames, in accordance with a frame rate and a display unit time, and controls the display device, causing the same to display the frames in rows and columns the numbers of which have been determined.

19 Claims, 9 Drawing Sheets

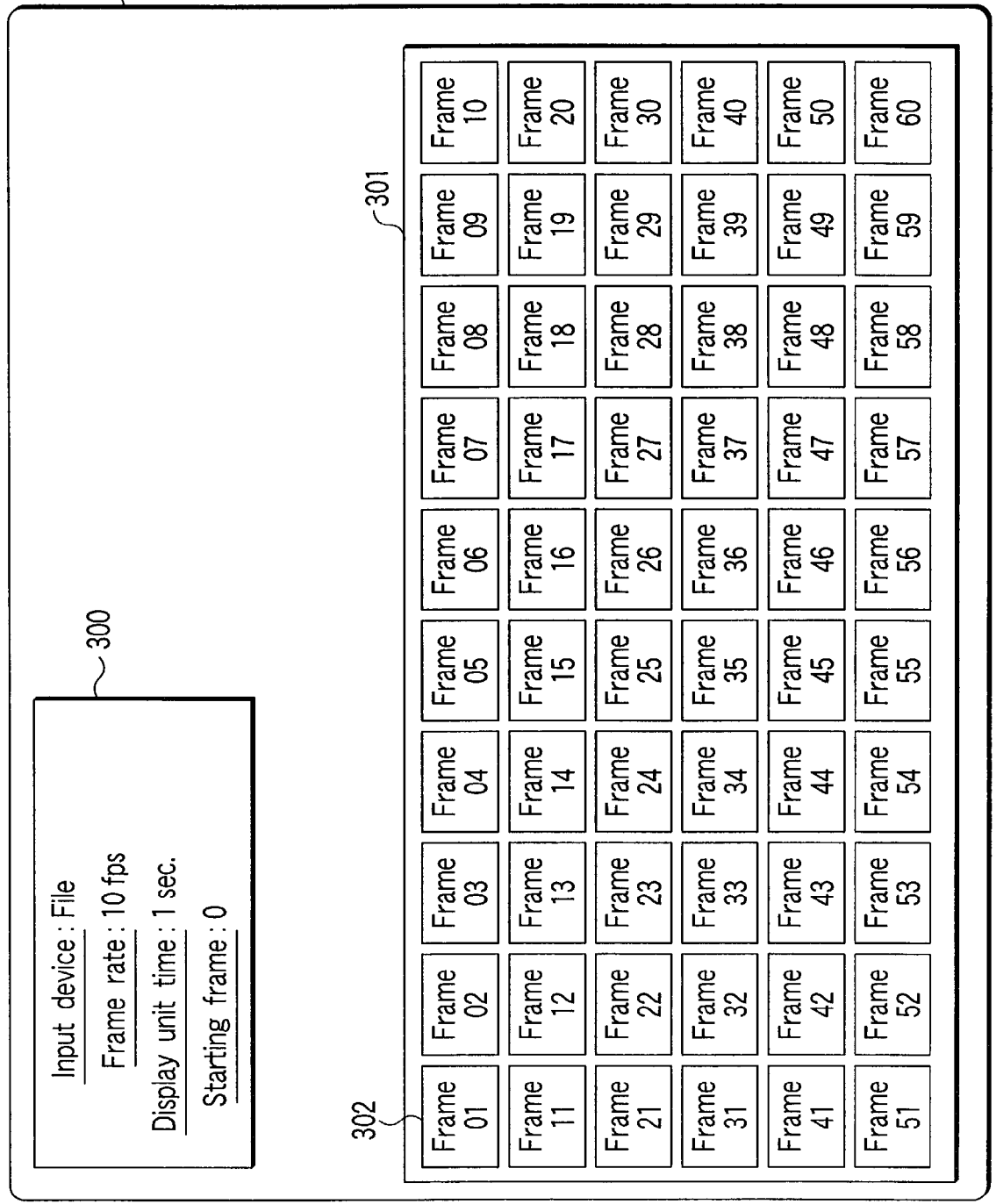
F I G. 3

METHOD AND APPARATUS FOR EDITING VIDEO DATA

CROSS-REFERENCE TO RELATED APPLICATIONS

This application is based upon and claims the benefit of priority from the prior Japanese Patent Application No. 2001-195037, filed Jun. 27, 2001, the entire contents of which are incorporated herein by reference.

BACKGROUND OF THE INVENTION

1. Field of the Invention

The present invention relates to an apparatus for editing digital moving-picture data and a method of editing digital moving-picture data. More particularly, the invention relates to a method of displaying a motion-picture editing field.

2. Description of the Related Art

In recent years, digital video cameras have found a broad use, and the digital broadcasting has been promoted. Much attention is now paid to apparatuses for use in not only broadcasting stations but also users' homes, which edit digital image data representing moving pictures. Generally, a moving-picture data editing apparatus comprises hardware and software. The hardware includes a personal computer and a digital video camera, each having an interface for inputting and outputting data. The software includes a data-editing program.

A moving picture is displayed when frames, or still pictures, are sequentially displayed at a prescribed rate. In other words, a moving picture is composed of a number of frames. The frame rate is usually the number of frames sequentially displayed per second. In the television broadcasting, for example, 30 frames per second (30 fps). A moving picture is thereby displayed on the TV screen.

Each moving-picture editing apparatus has a display (monitor). The display can display the frames of any moving picture. This enables the user to delete some frames, replace some frames with other frames and add some frames, thereby to edit the moving picture. To edit the moving picture at a high efficiency, the frames should be displayed in desired ways.

Jpn. Pat. Appln. KOKAI Publication No. 10-285532 discloses a moving-picture editing apparatus that displays the frames of a moving picture in a reduced size. Jpn. Pat. Appln. KOKAI Publication No. 8-23520 discloses a moving-picture editing apparatus that displays moving-picture frames in a reduced size, in M rows and N columns on the display screen.

With the apparatus of Publication No. 10-285532, however, the user cannot always edit moving pictures at high efficiency, because the apparatus displays the frames in only one column. With the apparatus of Publication No. 8-23520 that displays frames in M rows and N columns, the user can indeed edit moving pictures more efficiently than with the apparatus of Publication No. 10-285532. With the apparatus of Publication No. 8-23520, however, it is impossible for the user to perceive the display unit time based on the frame rate (i.e., frames per unit time). The display unit time is important in editing moving pictures. In view of this, the frames constituting a moving picture should be displayed in such a manner as to enable the user to perceive the display unit time.

BRIEF SUMMARY OF THE INVENTION

An object of the present invention is to provide a moving-picture editing apparatus and a moving-picture editing method, in which a moving picture is displayed such that the user can perceive the display unit time based on the frame rate of the moving picture.

In accordance with an aspect of the present invention, there is provided an apparatus for editing moving-picture data, which comprises: an input device which inputs moving-picture data; a display device which has a display screen and which displays the moving-picture data in the form of frames, on the display screen; and a controller which determines a number of rows and a number of columns in which to display the frames of the moving-picture data, in accordance with a frame rate and a display unit time, both contained in the moving-picture data input by the input device, and which controls the display device, causing the same to display the frames in rows and columns the numbers of which have been determined.

BRIEF DESCRIPTION OF THE SEVERAL VIEWS OF THE DRAWING

FIG. 3 shows a picture-editing field displayed in the first embodiment;

DETAILED DESCRIPTION OF THE INVENTION

Embodiments of the present invention will be described, with reference to the accompanying drawings.

(Moving-Picture Editing Apparatus)

Figure 1:
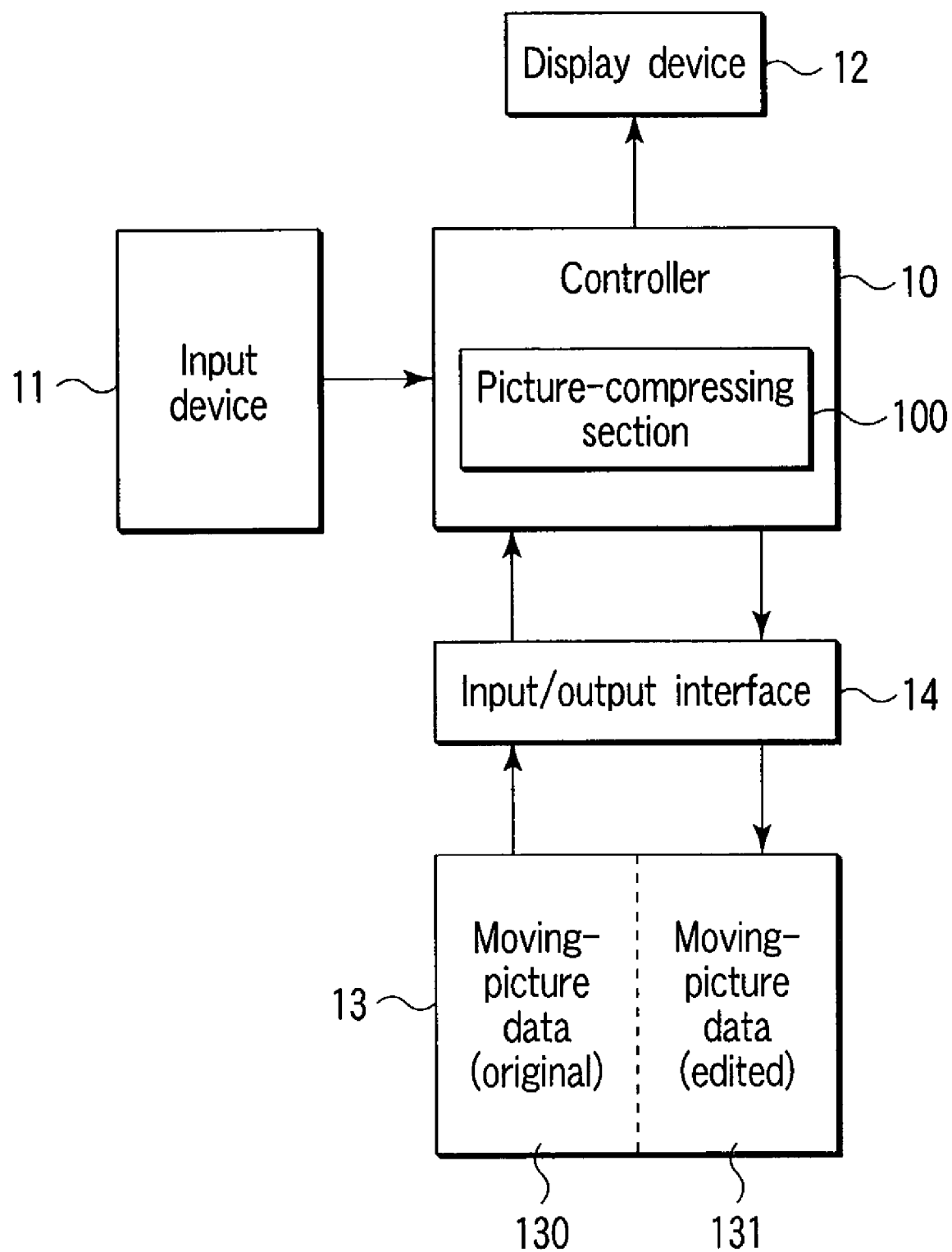
FIG. 1 is a block diagram showing the major components of a moving-picture editing apparatus according to a first embodiment of this invention.

FIG. 1 is a block diagram showing the major components of a moving-picture editing apparatus according to the first embodiment of the invention.

As FIG. 1 shows, the apparatus comprises a controller 10, an input device 11, a display device 12, a storage section 13, and an input/output interface 14. The controller 10 comprises a CPU and software, both incorporated in a personal computer or a digital video camera. The input device 11 is configured to input various data items that are required in editing moving pictures. The input device 11 is a keyboard, a mouse or the like.

The display device 12 is, for example, a liquid crystal display (LCD) or a CRT display, and has a display screen (or "screen"). The screen of the display device 12 displays a picture-editing field, in which frames of moving pictures are displayed. The storage section 13 is a storage device that stores moving-picture data (digital video data). More precisely, the section 13 is a memory card, a hard disk drive (HDD), a digital video (DV) tape drive, or the like. In this embodiment, the storage section 13 stores moving-picture data (original) 130 to be edited and moving-picture data 131 already edited. The storage section 13 may be replaced by two storage sections that store the moving-picture data 130 and the moving-picture data 131, respectively. The input/output interface 14 is configured to input moving-picture data 130 from the storage section 13 to the controller 10 and to input moving-picture data 131 from the controller 10 to the storage section 13.

As will be described later in detail and shown in FIG. 1, the controller 10 has a picture-compressing section 100. The section 100 is designed to compress moving-picture data in accordance with the MPEG (Moving Pictures Experts Group) standard. (The section 100 comprises circuits and software.)

(Process of Editing Moving Pictures)

How the first embodiment edits moving-picture data will be explained, with reference to FIG. 1, FIG. 2 (flowchart) and FIGS. 3 to 8.

The process of editing a moving-picture data includes various process items. Among these items are: deletion of at least one of the frames that constitute the moving picture; alteration of at least one of the frames; and grouping of the frames.

Assume that the storage section 13 stores the moving-picture data (original) 130 that has yet to be edited. The moving-picture data 130 has been supplied from a digital video camera or a television receiver.

The controller 10 determines whether the input device 11 has designated the starting frame of the moving-picture data 130, which should be edited (Step S1). The controller 10 manages each frame by using the frame number (variable FN) of the fame. If the user has operated the input device 11, designating the starting frame (if YES at Step S1), the controller 10 sets the frame number (NU), which the user has selected, to the variable FN (Step S3). If the user has not operated the input device 11 to designate the starting frame (if NO at Step S1), the controller 10 sets the initial frame number (either "1" or "0") to the variable FN (Step S2).

Then, the controller 10 determines whether the input device 11 has set a display unit time (variable IT) (Step S4). Assume that the moving-picture data 130 has a particular frame rate of 10 fps, as is illustrated in FIG. 3. If the user has operated the input device 11, inputting a display unit time (if YES at Step S4), the controller 10 sets the display unit time to a variable IT (Step S6). If the user has not operated the input device 11 to input a display unit time (if NO at Step S4), the controller 10 sets the variable IT at the value (1) that indicates one second (Step S5).

The controller 10 initializes the position at which a frame should be displayed on the screen of the display device 12 (Step S7). As FIG. 3 shows, the display device 12 displays a picture-editing field. In the picture-editing field, a data box 300 and a frame-displaying box 301 are displayed. The information about the moving-picture data to be edited is displayed in the data box 300. The frames 302 constituting the moving-picture data are displayed in the fame-displaying box 301. More precisely, frames 01 to 60 (i.e., still images) are displayed in rows and columns. The controller 10 manages the x-axis ordinates and y-axis ordinates in the frame-displaying box 301 in the form of variable X and variable Y, respectively. The upper-left corner of the frame-displaying box 301 is used as reference coordinates (X=0, Y=0) for the starting frame displayed.

As seen from FIG. 3, the picture-editing field helps the user to edit moving pictures having a frame rate of 10 fps (10 frames per second). The display unit time (IT) is set at one second, and the starting frame is the first frame (FN=1).

After Steps S1 to S7, which constitute a preparatory process, have been performed, the controller 10 determines whether all frames constituting the moving-picture data 130 has been fetched (Step S8). If NO at Step S8, the controller 10 starts acquiring the frames from the storage section 13 via the input/output interface 14. More precisely, the controller 10 receives the frames, each identified by the frame number that is represented by a variable FN (Step S9). (In this embodiment, fame number "01" identifies the frame that the controller 10 receives first.) The frames thus acquired are displayed (Step S10), each at a specified coordinates position in the fame-displaying box 301.

The controller 10 determines whether the display unit time has expired (Step S11). If NO at Step S11, the controller 10 increases the x coordinate by HD (Step S12) and the frame number FN by one (Step S14), every tenth of the unit time. (Note that "HD" is a horizontal distance HD distance between the x coordinates of any two adjacent frames of the same row.) This is because ten frames must be displayed during the display unit time (=1 second) as described above. Thus, as FIG. 3 shows, the first ten frames are displayed in one row until the display unit time expires.

If the display unit time has expired (if YES at Step S11), the controller 10 updates the y coordinate (Step S13). More precisely, the controller 10 increases the y coordinate by VD, i.e., a vertical distance between the y coordinates of any two adjacent frames of the same column. Then, the process goes to Step S14. At Step S14, the controller 10 increases the frame number FN by one. As a result, the first of the ten frames of the second row is displayed in the fame-displaying box 301.

The sequence of Steps S8 to S14 is repeated until the controller 10 determines at Step S8 that all frames constituting the moving-picture data 130 has been fetched. If YES at Step S8, the frames of the moving picture having the frame rate of 10 fps are displayed in rows and columns, in the fame-displaying box 301 as is illustrated in FIG. 3. Each row consists of ten frames that correspond to one display unit time (=1 second).

The controller 10 deletes, modifies and moves the frames displayed in the fame-displaying box 301, thus editing the moving-picture data, in accordance with the instructions the user has input at the input device 11 (Step S15). Then, the store the moving-picture data thus edited into the storage section 13 (Step S16). The controller 10 determines whether the moving-picture data has been edited or not (Step S17). If YES at Step S17, the operation is terminated.

The controller 10 determines the number of frames that can be simultaneously displayed in the fame-displaying box 301, not only from the frame rate and the display unit time, but also from the size of the frame-displaying box 301 and the size of each frame displayed. Hence, all frames of the moving picture to be edited may not be displayed in the box 301 at the same time. In such a case, Steps S7 to S17 are repeated until the controller 10 determines at Step S17 that the moving-picture data has been edited.

In the moving-picture editing apparatus described above, the display device 12 displays the frames constituting a moving picture in rows and columns in the frame-displaying box 301 as is illustrated in FIG. 3. As FIG. 3 shows, each row consists of ten frames and displayed for one display unit time (e.g., one second), because the moving picture has the frame rate of 10 fps. Looking at the frames displayed in this manner, the user can quickly perceive both the frame rate and the display unit time and can edit the moving picture, in units of rows of frames, by deleting some frames from each row, replacing some frames with other frames in each row and adding some frames to each row. After editing the moving picture in this way, he or she can quickly know how long the moving picture thus edited will last when it is reproduced.

(Modified Picture-Editing Fields)

FIGS. 4 to 8 show various modifications of the picture-editing field described with reference to FIG. 3.

Figure 4:
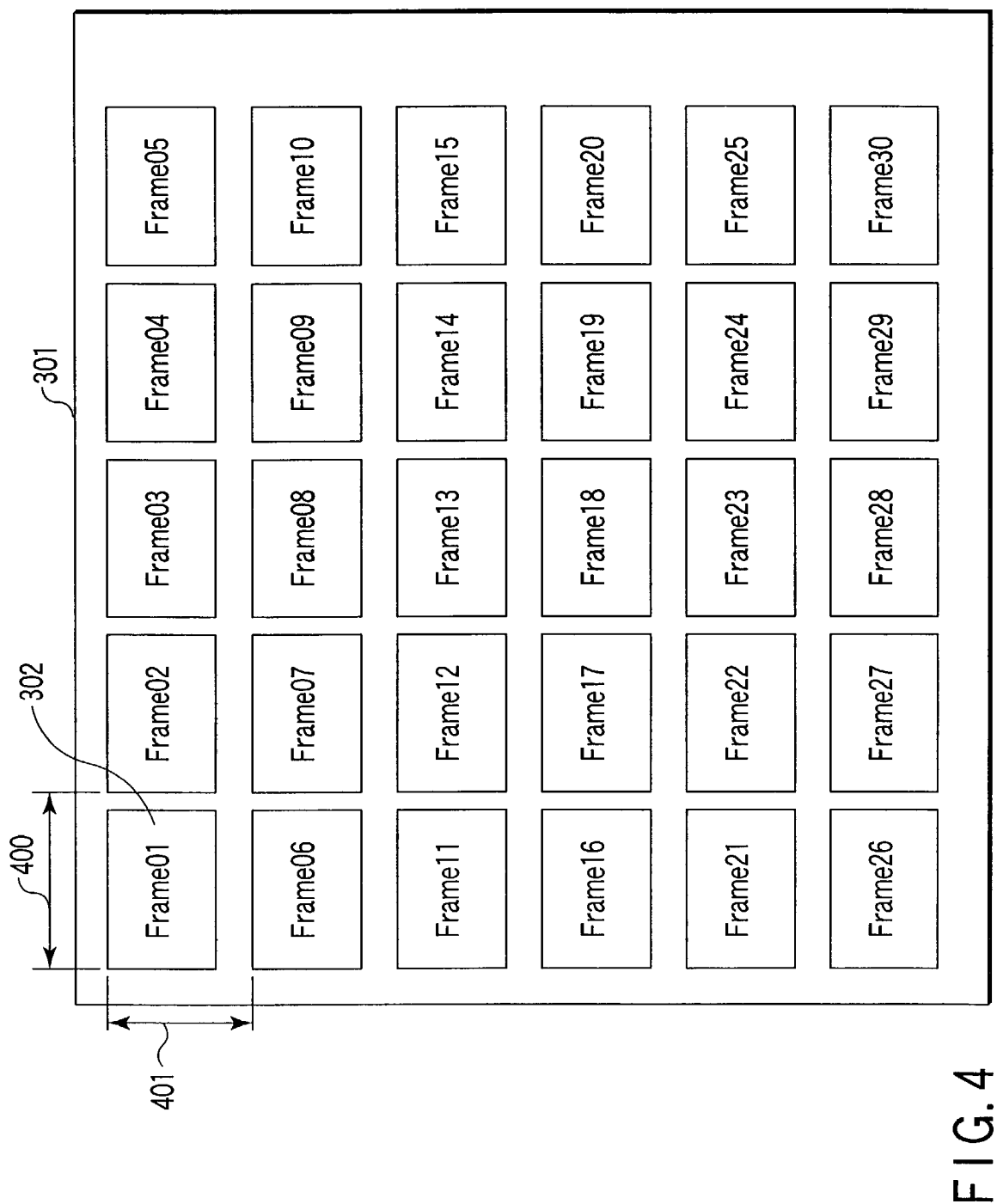
FIG. 4 shows a first modification of the frame-displaying box displayed in the picture-editing field.

FIG. 4 shows the first modified frame-displaying box that is designed to enable the user to edit moving-picture data that has the frame rate of 5 fps and the display unit time (IT) of one second.

In FIG. 4, "400" is the distance the controller 10 increases the x coordinate by the distance HD distance between the x coordinates of any two adjacent frames of the same row, and "401" is the vertical distance VD between the y coordinates of any two adjacent frames of the same column. In the first modified frame-displaying box, the first frame 01 to thirtieth frame 30 of a moving picture are first displayed, in six rows, each consisting of five frames (i.e., still pictures) that form a 1-second part of the moving picture.

Figure 5:
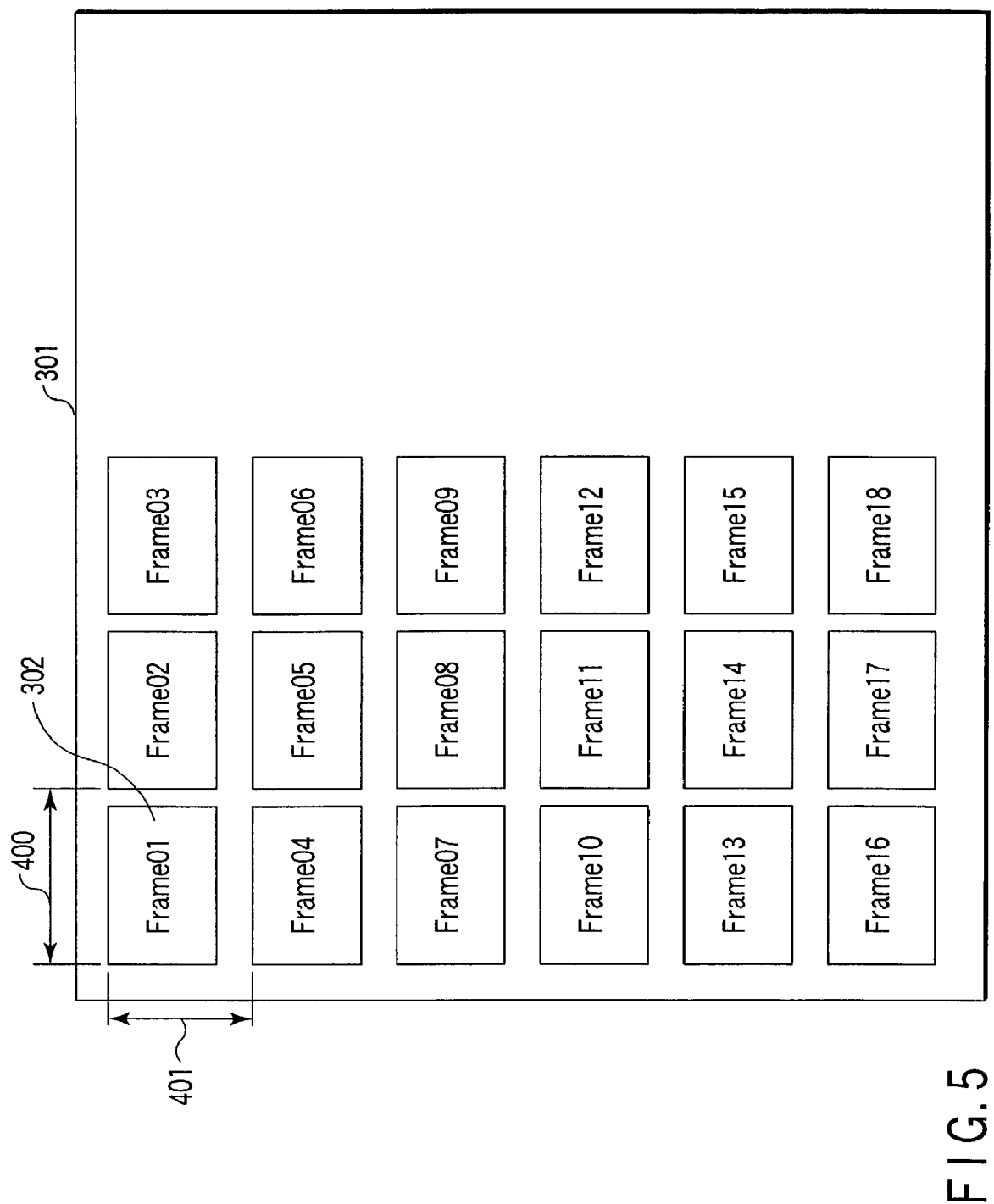
FIG. 5 depicts a second modification of the frame-displaying box.

FIG. 5 shows the second modified frame-displaying box that is designed to enable the user to edit moving-picture data that has the frame rate of 3 fps and the display unit time (IT) of one second.

In the second modified frame-displaying box, the first frame 01 to eighteenth frame 18 of a moving picture are first displayed, in six rows and three columns, each row consisting of three frames (i.e., still pictures) that form a 1-second (display unit time) part of the moving picture.

Figure 6:
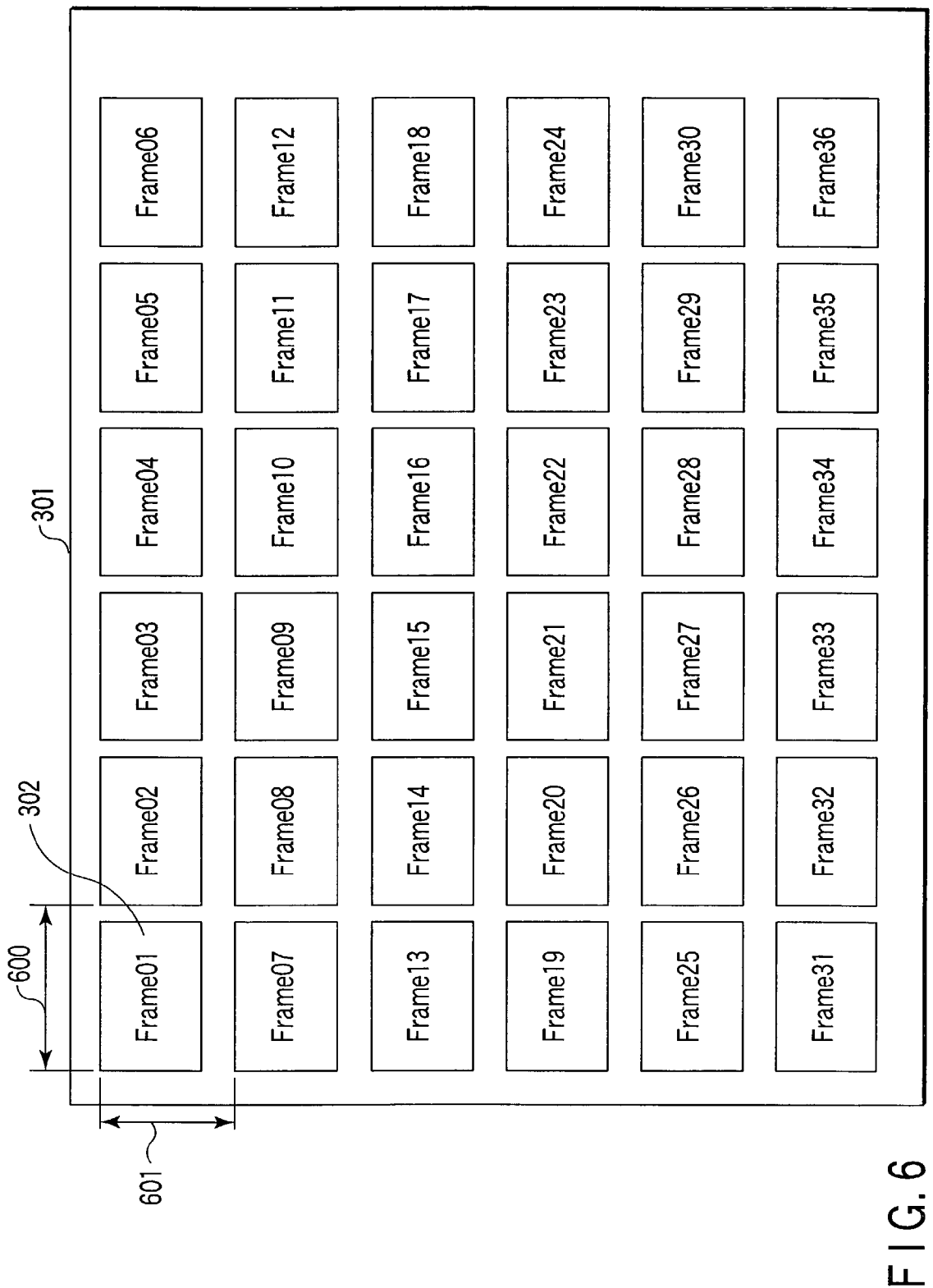
FIG. 6 shows a third modification of the frame-displaying box.

FIG. 6 shows the third modified frame-displaying box that is designed to enable the user to edit moving-picture data that has the frame rate of 3 fps and the display unit time (IT) of two seconds.

In the third modified frame-displaying box, the first frame 01 to thirty-sixth frame 36 of a moving picture are first displayed, in six rows and three columns, each row consisting of six frames (i.e., still pictures) that form a 2-second (display unit time) part of the moving picture. In FIG. 6, "600" is the distance the controller 10 increases the x coordinate by the distance HD distance between the x coordinates of any two adjacent frames of the same row, and "601" is the vertical distance VD between the y coordinates of any two adjacent frames of the same column.

As indicated above, the frames of each row displayed in the first and second modified frame-displaying box form a 1-second part of the moving picture, whereas the frames of each row displayed in the first and second modified frame-displaying box form a 2-second part of the moving picture. This means that the user can set the display unit time (IT) at any desired value, thus changing the frame matrix configuration to any one he or she desires.

Figure 7:
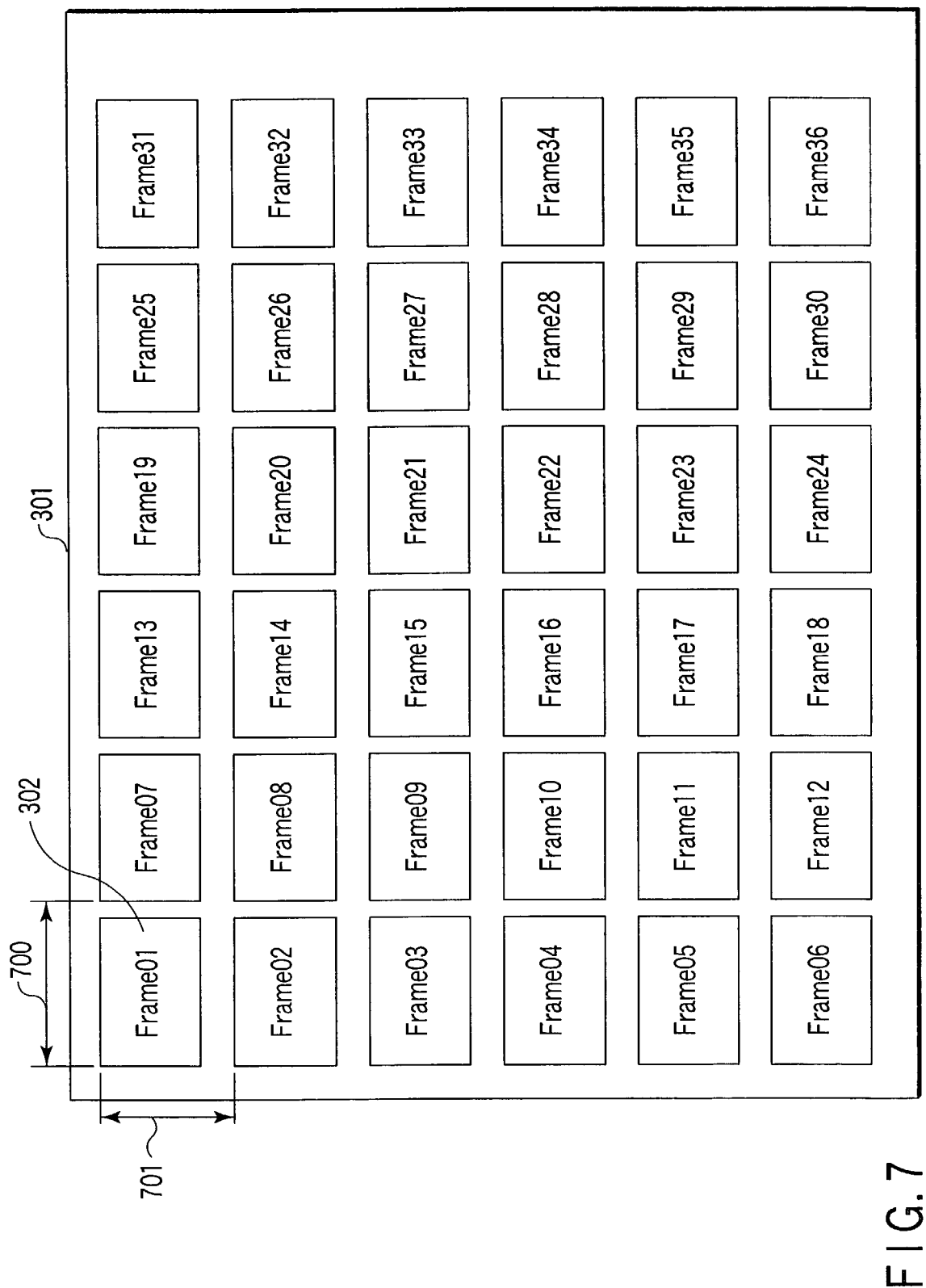
FIG. 7 shows a fourth modification of the frame-displaying box.

FIG. 7 shows the fourth modified frame-displaying box that is designed to enable the user to edit moving-picture data that has the frame rate of 6 fps and the display unit time (IT) of one second. In FIG. 7, "700" is the distance the controller 10 increases the x coordinate by the distance HD distance between the x coordinates of any two adjacent frames of the same row, and "701" is the vertical distance VD between the y coordinates of any two adjacent frames of the same column.

The fourth modified frame-displaying box differs from the first to third modified frame-displaying boxes in that the first to sixth frames of a moving picture are displayed in the leftmost column, the seventh to twelfth frames in the second leftmost column, the thirteenth to eighteenth frames in the third leftmost column, and so forth. The six frames (i.e., still pictures) of each column form a 1-second (display unit time) part of the moving picture. The six columns of frames (i.e., the leftmost to the rightmost column) correspond to the six rows of frames shown in FIG. 6, and the six rows of frames (i.e., the uppermost to the lowermost row) correspond to the six columns of frames illustrated in FIG. 6.

Figure 8:
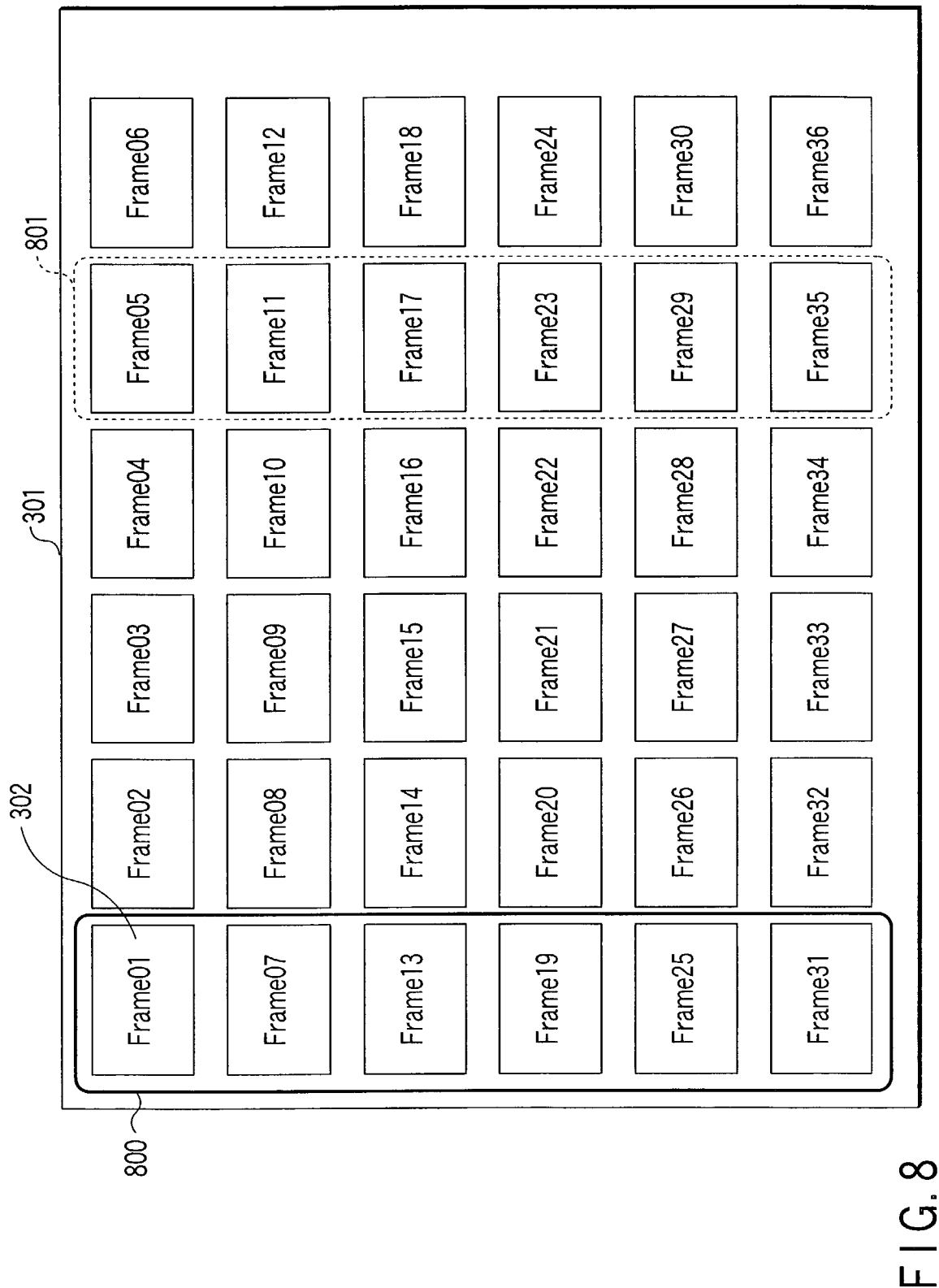
FIG. 8 illustrates a fifth modification of the frame-displaying box.

FIG. 8 shows the fifth modified frame-displaying box that is designed to enable the user to edit a moving picture that has a frame rate of 6 fps (i.e., six frame per second) and a display unit time (IT) of one second. With reference to FIG. 8, it will be explained how the user edits the 6-fps moving picture into a 1-fps moving picture.

Assume that the first thirty-six frames of a 6-fps moving picture are displayed in six rows and six columns in the frame-displaying box 310 as illustrated in FIG. 8. The user may operate the input device 11, selecting a group 800 consisting of six frames 01, 07, 13, 19, 25 and 31, each being the first frame of one row that form a 1-second (display unit time) part of the moving picture. The frames 01, 07, 13, 19, 25 and 31 are then combined, forming a 6-second part of a 1-fps moving picture.

Alternatively, the user may operate the input device 11, selecting a group 801 consisting of six frames 05, 11, 17, 23, 29 and 35, each being the fifth frame of one row that form a 1-second part of the moving picture. In this case, the frames 05, 11, 17, 23, 29 and 35 are combined, forming a 6-second part of a 1-fps moving picture.

As described with reference to FIG. 8, the user sets the display unit time at one second and selects six frames displayed in any one column in order to edit the moving picture to a 1-fps moving picture. In the course of editing the moving picture so, the user can easily know which frames will form a 1-second part of the 1-fps moving picture.

To edit the moving picture into a 2-fps moving picture, the user only needs to set the display unit time at one second and select two columns of frames. More specifically, the user may select two groups 800 and 8001 shown in FIG. 8, i.e., a column consisting of frames 01, 07, 13, 19, 25 and 31 and a column consisting of frames 05, 11, 17, 23, 29 and 35. In this case, the frames 01, 05, 07, 11, 13 and 17 form a first 0.5-second part of a 2-fps moving picture, while the frames 19, 23, 25, 29, 32 and 35 form the next 0.5-second part of the 2-fps moving picture. Alternatively, to edit the moving picture into a 2-fps moving picture, the user may set the display unit time at 0.3 seconds and may select one column of frames. In short, the moving-picture editing apparatus makes it easy for the user to edit moving pictures into one having various frame rates only if he or she sets the display unit time at various values.

(Second Embodiment)

Figure 9:
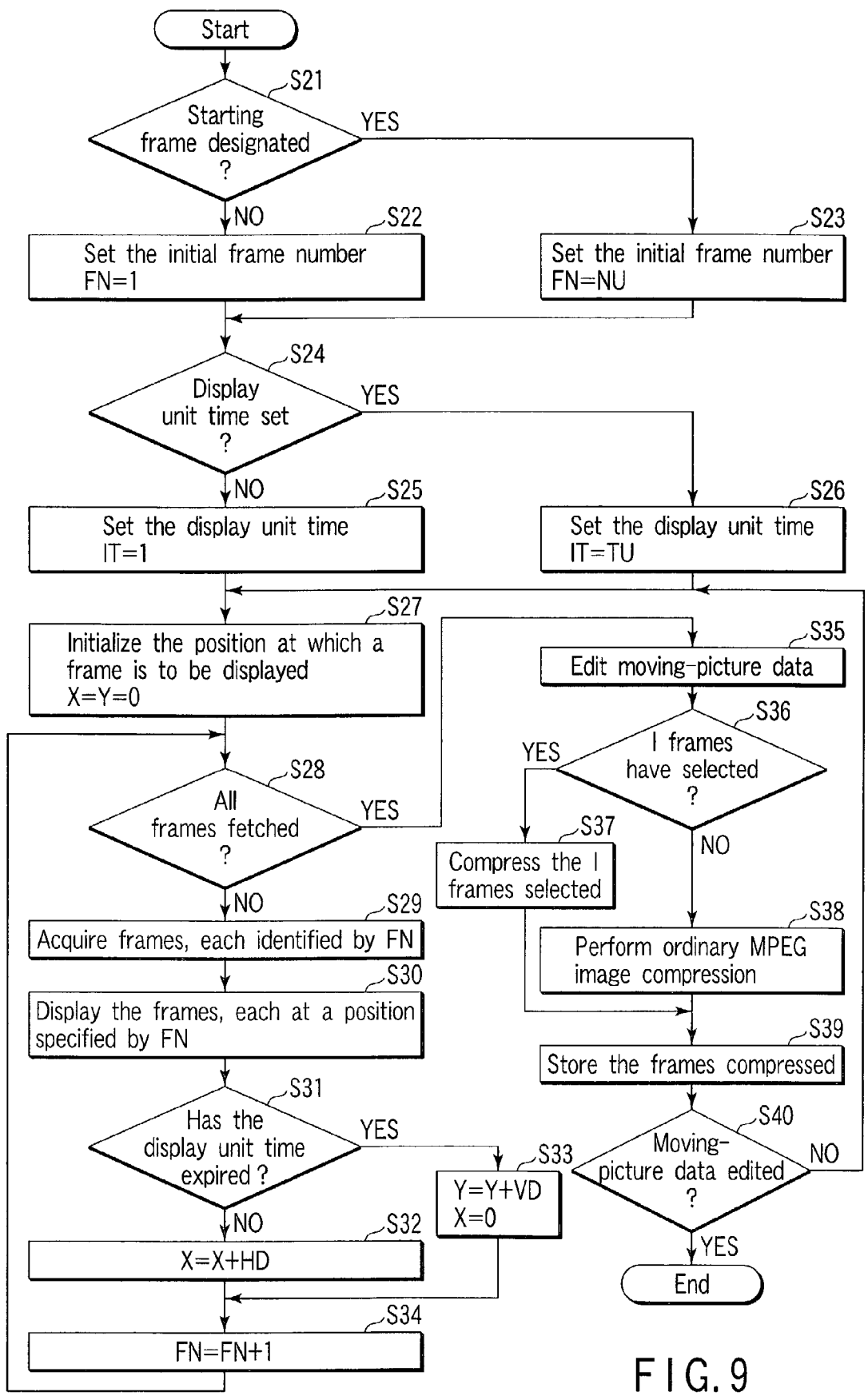
FIG. 9 is a flowchart explaining the sequence of a frame-displaying process and the sequence of a moving-picture editing process, both performed in a second embodiment of the invention.

The flowchart of FIG. 9 explains the sequence of a frame-displaying process and the sequence of a moving-picture editing process, both performed in a second embodiment of the invention.

As described above, the controller 10 of the moving-picture editing apparatus has a picture-compressing section 100. The section 100 is designed to compress moving-picture data in accordance with the MPEG (Moving Pictures Experts Group) standard. In the second embodiment, the picture-compressing section 100 processes any frame selected in the course of editing moving pictures, as a compression basic frame. The section 100 then performs MPEG image compression on the compression basic frame. (MPEG image compression utilizes inter-frame prediction encoding.) The compression basic frame is intra-frame encoded data (i.e., one-frame data), not generated by carrying out differential compression on the two frames that immediately precedes and follows the frame of interest, respectively. Hence, the compression basic frame is predicted image data that is required in compressing the other frames. Hereinafter, the compression basic frame shall be referred to as "I frame."

How the second embodiment operates will be described, with reference to the flowchart of FIG. 9.

Figure 2:
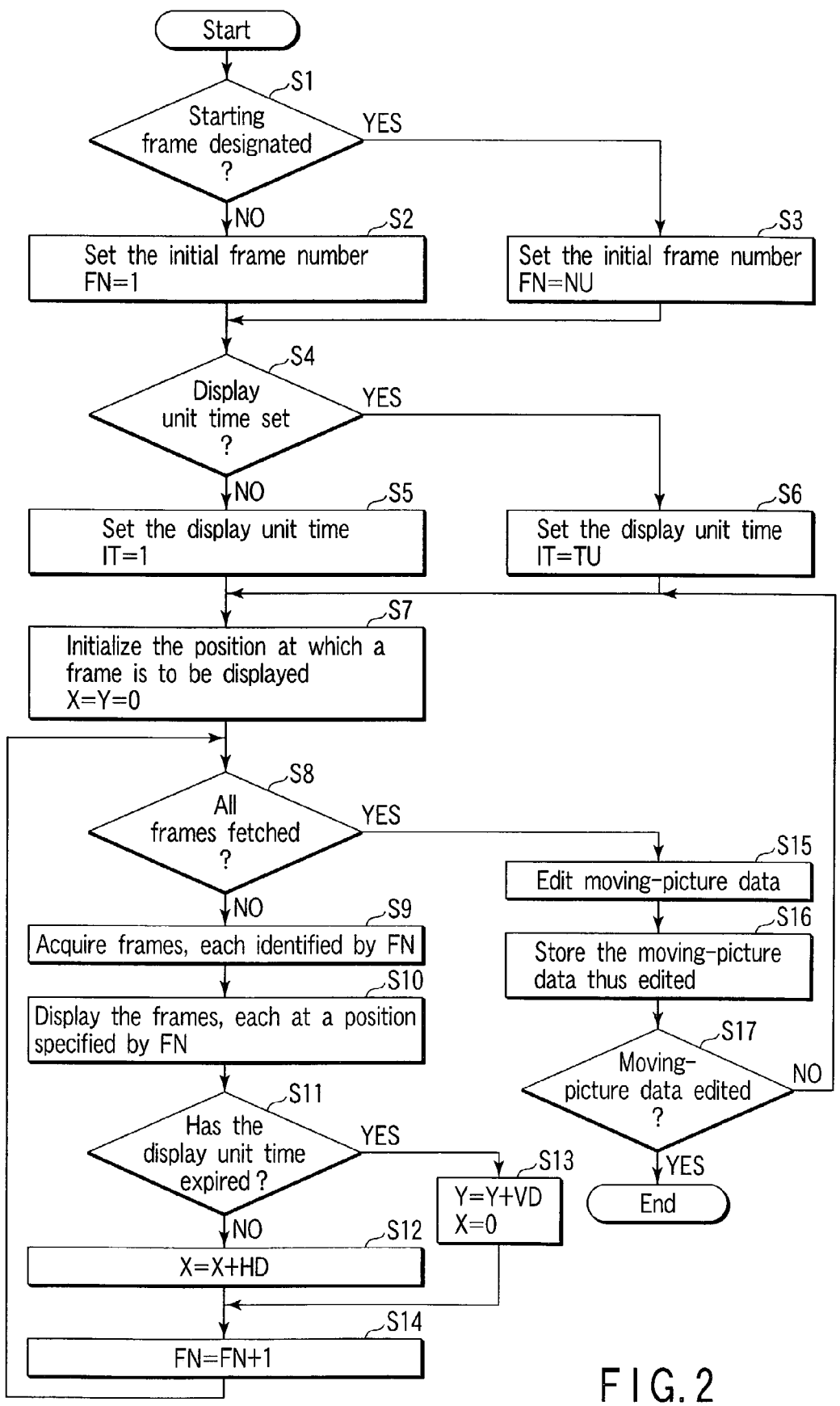
FIG. 2 is a flowchart explaining the sequence of a frame-displaying process and the sequence of a moving-picture editing process, both performed in the first embodiment.

Steps S21 to S34 are identical to Steps S1 to S14 shown in FIG. 2. First, the controller 10 determines whether the input device 11 has designated the starting frame of the moving-picture data 130, which should be edited (Step S21). If the user has operated the input device 11, designating the starting frame (if YES at Step S21), the controller 10 sets the frame number (NU), which the user has selected, to the variable FN (Step S23). If the user has not operated the input device 11 to designate the starting frame (if NO at Step S21), the controller 10 sets the initial frame number (either "1" or "0") to the variable FN (Step S22).

Then, the controller 10 determines whether the input device 11 has set a display unit time (variable IT) (Step S24). Assume that the moving-picture data 130 has a particular frame rate of 10 fps, as is illustrated in FIG. 3. If the user has operated the input device 11, inputting a display unit time TU (if YES at Step S24), the controller 10 sets the display unit time to a variable IT (Step S26). If the user has not operated the input device 11 to input a display unit time (if NO at Step S24), the controller 10 sets the variable IT at the value (1) that indicates one second (Step S25). Further, the controller 10 initializes the position at which a frame should be displayed on the screen of the display device 12 (Step S27).

After Steps S21 to S27, which constitute a preparatory process, have been performed, the controller 10 determines whether all frames constituting the moving-picture data 130 has been fetched (Step S28). If NO at Step S28, the controller 10 starts acquiring the frames from the storage section 13 via the input/output interface 14. That is, the controller 10 receives the frames, each identified by the frame number that is represented by a variable FN (Step S29). (The frame that the controller 10 receives first is identified by fame number "01.") The frames thus acquired are displayed (Step S30), each at a specified coordinates position in the fame-displaying box 301.

The controller 10 determines whether the display unit time has expired (Step S31). If NO at Step S31, the controller 10 increases the x coordinate by HD (Step S32) and the frame number FN by one (Step S34), every tenth of the unit time. This is because ten frames must be displayed during the display unit time (=1 second) as described above. Thus, as FIG. 3 shows, the first ten frames are displayed in one row until the display unit time expires.

If the display unit time has expired (if YES at Step S31), the controller 10 updates the y coordinate (Step S33). More precisely, the controller 10 increases the y coordinate by VD, i.e., a vertical distance between the y coordinates of any two adjacent frames of the same column. Then, the process goes to Step S34. At Step S34, the controller 10 increases the frame number FN by one. As a result, the first of the ten frames of the second row is displayed in the fame-displaying box 301.

If the controller 10 determines that all frames of the moving-picture data 130 has been fetched (if YES at Step S28,) the controller 10 edits the moving-picture data (S35). That is, the controller 10 deletes, modifies and moves the frames displayed in the fame-displaying box 301, in accordance with the instructions the user has input at the input device 11. Then, the controller 10 determines whether I frames have has been selected (Step S36). If I frames (e.g., the frames 01, 07, 13, 19, 25 and 31 of group 800 shown in FIG. 8) have been selected (if YES at Step S36), the picture-compressing section 100 performs MPEG image compression by using the I frames (Step S37). If the user has selected no I frames (if NO at Step S36), the section 100 carries out ordinary MPEG image compression (Step S38). The controller 10 outputs the frames edited (i.e., deleted, modified, moved or compressed) to the storage section 13 via the input/output interface 14 (Step S39). The controller 10 determines whether the moving-picture data has been edited or not (Step S40). If YES at Step S40, the operation is terminated. If NO at Step S40, Steps S27 to S38 are repeated until the controller 10 determines at Step S40 that the moving-picture data has been edited in its entirety.

In the second embodiment, the picture-compressing section 100 performs MPEG image compression by using any frame that the user has selected, as an I frame (i.e., a compression basic frame). For example, the user may select the frames 01, 07, 13, 19, 25 and 31 of group 800 (FIG. 8) as I frames. In this case, the section 100 performs MPEG image compression by using the I frames.

In short, the display device 12 displays the frames constituting a moving picture in such a way that the user may quickly perceive the display unit time that is based on the frame rate. The user can, therefore, edit the moving picture in units of rows of frames at high efficiency, by deleting, replacing, adding frames in each row. Moreover, when the frame rate of the moving picture is changed, the display device 12 displays the frames the picture in such a way that the user can quickly know the new frame rate. Hence, the user can easily imagine how the moving picture will look when reproduced. For example, the user can predict how long the moving picture thus edited will last when it is reproduced. Further, two or more rows of frames can be displayed at a time in the fame-displaying box 301. This makes it easy for the user to edit any group of frames forming a part of the moving picture, which lasts for the display unit time.

In other words, the user can easily perceive the display unit time based on the frame rate, just looking at the frames displayed in the box 301 and constituting a moving picture. The frames may be displayed in the ordinary size, a reduced size or a magnified size.

The second embodiment enables the user to edit the moving picture, while perceiving the display unit time based on the frame rate. As a result, the user can edit the moving picture with high efficiency.

Additional advantages and modifications will readily occur to those skilled in the art. Therefore, the invention in its broader aspects is not limited to the specific details and representative embodiments shown and described herein. Accordingly, various modifications may be made without departing from the sprint or scope of the general inventive concept as defined by the appended claims and their equivalents.

What is claimed is:

1. An apparatus for editing moving-picture data, comprising:
   an input device which inputs moving-picture data;
   a display device which has a display screen and which displays the moving-picture data in the form of frames, on the display screen;

a controller which determines a number of rows and a number of columns in which to display the frames of the moving-picture data, in accordance with a frame rate and a display unit time, both contained in the moving-picture data input by the input device, and which controls the display device, causing the same to display the frames in rows and columns the numbers of which have been determined.

2. An apparatus according to claim 1, wherein the controller controls the display device, causing the same to display a starting frame at a predetermined reference position on the display screen when the starting frame is designated, along with other frames which form a frame matrix, jointly with the starting frame that is used as a reference frame.

3. An apparatus according to claim 2, wherein the controller has:
   image-compressing means for compressing the moving-picture data by using a inter-frame encoding system, and
   control means for controlling the image-compressing means by setting a designated one of the frames displayed on the display screen, as a compressed basic frame that is a intra-frame code, and by using the compressed basic frame as a predicted image data item.

4. An apparatus according to claim 2, wherein the controller has image-compressing means for compressing the frames in accordance with a size of the display screen, thereby to display the frames in the number of rows and the number of columns, which have been determined.

5. An apparatus according to claim 4, wherein the controller has editing means for deleting, replacing and adding frames in a frame matrix displayed on the display screen, thereby editing the frame matrix.

6. An apparatus according to claim 5, further comprising output means for outputting moving-picture data representing the frame matrix edited by the editing means.

7. An apparatus according to claim 2, wherein the controller has editing means for deleting, replacing and adding frames in the frame matrix displayed on the display screen, thereby editing the frame matrix.

8. An apparatus according to claim 7, further comprising output means for outputting moving-picture data representing the frame matrix edited by the editing means.

9. An apparatus according to claim 1, wherein the controller has image-compressing means for compressing the frames in accordance with a size of the display screen, thereby to display the frames in the number of rows and the number of columns, which have been determined.

10. An apparatus according to claim 9, wherein the controller has editing means for deleting, replacing and adding frames in a frame matrix displayed on the display screen, thereby editing the frame matrix.

11. An apparatus according to claim 10, further comprising output means for outputting moving-picture data representing the frame matrix edited by the editing means.

12. An apparatus according to claim 1, wherein the controller has editing means for deleting, replacing and adding frames in a frame matrix displayed on the display screen, thereby editing the frame matrix.

13. An apparatus according to claim 12, further comprising output means for outputting moving-picture data representing the frame matrix edited by the editing means.

14. An apparatus according to claim 1, wherein the controller has:
   image-compressing means for compressing the moving-picture data by using a inter-frame encoding system, and
   control means for controlling the image-compressing means by setting a designated one of the frames displayed on the display screen, as a compressed basic frame that is a intra-frame code, and by using the compressed basic frame as a predicted image data item.

15. A method of editing moving-picture data in a moving-picture editing apparatus which edits input moving-picture data in units of frames, said method comprising:
   determining a number of rows and a number of columns in which to display the frames of the moving-picture data, in accordance with a frame rate and a display unit time, both contained in the moving-picture data; and
   displaying the frames on a display screen, in the form of a frame matrix consisting of rows and columns the numbers of which have been determined.

16. A method according to claim 15, further comprising:
   compressing the frames in accordance with a size of the display screen, thereby to display the frames in the number of rows and the number of columns, which have been determined.

17. A method according to claim 15, further comprising:
   deleting, replacing and adding frames in the frame matrix displayed on the display screen, thereby editing the frame matrix.

18. A method according to claim 15, wherein the moving-picture editing apparatus has image-compressing means for compressing the moving-picture data by using a inter-frame encoding system, and the image-compressing means is controlled by setting a designated one of the frames displayed on the display screen, as a compressed basic frame that is a intra-frame code, and by using the compressed basic frame as a predicted image data item.

19. A computer-readable storage medium comprising:
   first instruction means for causing a computer to receive moving-picture data;
   second instruction means for determining a number of rows and a number of columns in which to display the frames of the moving-picture data on a display screen, in accordance with a frame rate and a display unit time, both contained in the moving-picture data;
   third instruction means for causing the computer to display the frames on the display screen, in the form of a frame matrix consisting of rows and columns the numbers of which have been determined; and
   fourth instruction means for causing the computer to edit the moving-picture data in units of frames.

* * * * *